(12) United States Patent
Koike (10) Patent No.: US 7,076,161 B2
(45) Date of Patent: Jul. 11, 2006

(54) LENS-FITTED PHOTO FILM UNIT AND PRINTING METHOD

(75) Inventor: Kazumi Koike, Minami-Ashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/643,863

(22) Filed: Aug. 20, 2003

(65) Prior Publication Data
US 2004/0062533 A1 Apr. 1, 2004

(30) Foreign Application Priority Data
Aug. 22, 2002 (JP) .............................. 2002-241483

(51) Int. Cl.
G03B 17/02 (2006.01)
G03B 15/03 (2006.01)
G03B 17/24 (2006.01)
G03B 13/06 (2006.01)

(52) U.S. Cl. .................... 396/6; 396/176; 396/311; 396/382

(58) Field of Classification Search .............. 396/6, 396/30–41, 351, 310, 311, 176, 373, 382
See application file for complete search history.

(56) References Cited

U.S. PATENT DOCUMENTS 5,453,804 A * 9/1995 Norris et al. ................. 396/31
5,968,719 A * 10/1999 Nakamura ................... 430/394
6,154,609 A   11/2000 Muramatsu et al. ........... 396/6
6,249,652 B1 * 6/2001 Kamata et al. .............. 396/311
6,388,738 B1 * 5/2002 Abe ............................ 356/17
2001/0036365 A1 * 11/2001 Sanda et al. ................. 396/310
2002/0057907 A1 * 5/2002 Kamata ......................... 396/6

FOREIGN PATENT DOCUMENTS

| JP | 7-64178   | 3/1995   |
| JP | 7-120823  | 5/1995   |
| JP | 7-209741  | 8/1995   |
| JP | 09-197490 | * 7/1997 |

* cited by examiner

Primary Examiner—W. B. Perkey
Assistant Examiner—Rochelle Blackman
(74) Attorney, Agent, or Firm—Young & Thompson

(57) ABSTRACT

A lens-fitted photo film unit comprises a main body, a bottom lid, and a photo film. The main body has an exposure chamber with a taking lens. The exposure chamber is provided with a plane mirror disposed in such a manner as to be inclined 45 degrees with respect to the optical axis of the taking lens. Since the plane mirror reflects light from a subject, a photographic optical path of the light is perpendicularly bent. Subject light forms an image on the photo film disposed in parallel with the optical axis. A side print is exposed in the manufacture on the lateral edge of the photo film. Since the orientation of the photographed image is the same as that of the side print, it is possible to easily confirm the orientation of the photographed image in the development and print processes.

8 Claims, 11 Drawing Sheets

LENS-FITTED PHOTO FILM UNIT AND PRINTING METHOD

BACKGROUND OF THE INVENTION

1. Field of the Invention

The present invention relates to a lens-fitted photo film unit having a plane mirror for bending a photographic optical path, and a method for printing an image photographed with this lens-fitted photo film unit.

2. Background Arts

A well-known lens-fitted photo film unit is preloaded with an unexposed photo filmstrip. The lens-fitted photo film unit is widely used because of its low price and facility to take a photograph with easy operations just after purchase. The lens-fitted photo film unit has been miniaturized in recent years. Using an APS film cartridge the size of which is smaller than a 35 mm film cartridge, for example, makes it possible to reduce the size of a cartridge chamber and an exposure area, so that a unit body becomes thin.

In the conventional lens-fitted photo film unit, the photo filmstrip is disposed in such a manner as to be orthogonal to the optical axis of a taking lens. Accordingly, the thickness of the unit body has to be larger than the focal length of the taking lens. To solve this problem, Japanese Patent Laid-Open Publication Nos. 7-64178, 7-120823 and 7-209741 disclose lens-fitted photo film units with a mirror for perpendicularly bending a photographic optical path. According to these film units, since the photo filmstrip is disposed in parallel with the optical axis of the taking lens, it is possible to thin the unit body without changing the focal length.

An image obtained by a mirror-equipped photographic optical system, however, is flipped horizontally or vertically on the photo film, with respect to an image taken by a conventional photographic optical system. In other words, a photographed image from an emulsion surface side or a film base side of the photo film becomes reversed with respect to the photographed image by the conventional photographic optical system.

In printing the image from the photo film to photographic paper, the orientation of the photo film is confirmed with reference to the orientation of characters which are printed on the edge of the photo film as a side print. Thus, when an ordinary photo film is used in the mirror-equipped photographic optical system, there is a problem that a printing error such as reverse printing occurs because the photographed image in the photo film is flipped with respect to the side print. To solve this problem, it is considerable to process the photo film used in the mirror-equipped photographic optical system separately from that used in a conventional photographic optical system, but it is troublesome.

In above Japanese Patent Laid-Open Publication No. 7-209741, information indicating that a flipped image is photographed is optically or magnetically recorded on a photo film. In terms of reducing the manufacture cost, however, it is impossible to provide a magnetic or optical recording device in the lens-fitted photo film unit.

SUMMARY OF THE INVENTION

An object of the present invention is to provide a lens-fitted photo film unit at low cost which is provided with a photographic optical system having a mirror to realize miniaturization, and can certainly prevent reverse printing.

Another object of the present invention is to provide a printing method which is properly applicable to printing an image photographed with the above lens-fitted photo film unit.

To achieve the above objects, the lens-fitted photo film unit according to the present invention comprises a taking lens, a plane mirror for perpendicularly bending a photographic optical path of light from a subject, and a photo film disposed approximately in parallel with an optical axis of the taking lens. The photo film has a base surface and an emulsion surface. The reflected light forms an image on the emulsion surface. A side print is recorded as a latent image on the edge of the photo film, in such a manner as to flip from side to side or from top to bottom in view of the side of the base surface.

The lens-fitted photo film unit further comprises a viewfinder. The viewfinder has an objective lens element with a negative refractive power, a first eyepiece lens element, and a second eyepiece lens element.

When refractive power of the first and second eyepiece lens elements is denoted as P1 and P2, respectively, P1 and P2 satisfy the following equation:

$$P1 > |P2|$$

When the width of the viewfinder is denoted as W, W satisfies the following equation:

$$W > 26$$

A target mark is formed in the pupil side surface of the first eyepiece lens element. A micro lens is disposed in the pupil side surface of the second eyepiece lens element. The target mark enlarged by the micro lens appears in the field of view of the viewfinder.

When L is defined as the length between the pupil side surface of the objective lens element and the objective side surface of the first eyepiece lens element, L and W satisfy the following equation:

$$0.2 < L/W < 0.7$$

According to the present invention, since the orientation of the photographed image is the same as that of the side print, confirming the orientation of the side print makes it possible to easily confirm the orientation of the photographed image. Accordingly, it is possible to subject the photo film, used in the lens-fitted photo film unit according to the present invention, to a developing process together with a photo film used in an ordinary camera.

In the viewfinder, the refractive power P1 and P2 of the first and second eyepiece lens elements, the width W, and the length L between the surface on the pupil side of the objective lens element and the surface on the objective side of the first eyepiece lens element are restricted within a predetermined range. Therefore, it is possible to obtain the fine field of view of the viewfinder without enlarging the aperture size of the viewfinder and the diameter of the lens element.

BRIEF DESCRIPTION OF THE DRAWINGS

The above objects and advantages of the present invention will become apparent from the following detailed descriptions of the preferred embodiments when read in association with the accompanying drawings, which are given byway of illustration only and thus do not limit the present invention. In the drawings, the same reference numerals designate like or corresponding parts throughout the several views, and wherein.

DETAILED DESCRIPTION OF THE EMBODIMENTS

Figure 1:
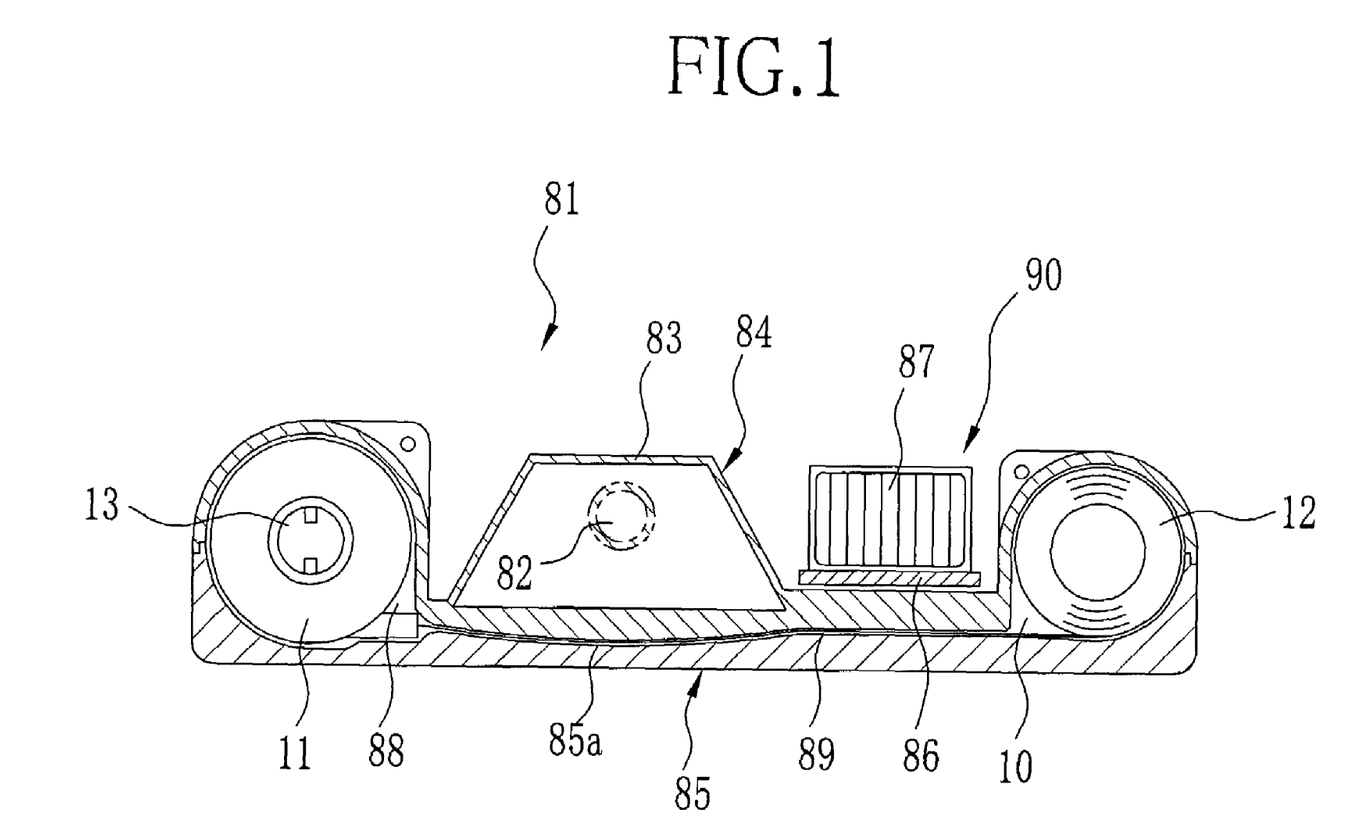
FIG. 1 is a partly sectional front side view of a lens-fitted photo film unit.

Referring to FIG. 1, a lens-fitted photo film unit 81 comprises a main body 84, a bottom lid 85, and a photo filmstrip 12 preloaded between the main body 84 and the bottom lid 85. The main body 84 is provided with an exposure chamber 83 having a taking lens 82 and a flash mechanism 90.

A cartridge chamber 88, a film path 89, and a film roll chamber 10 are formed between the main body 84 and the bottom lid 85. The cartridge chamber 88 light-tightly contains a cartridge shell 11. The cartridge shell 11 has a spool 13 to which one end of the photo filmstrip 12 is secured. The photo filmstrip 12 drawn out of the cartridge shell 11 is wound up into a roll shape in the film roll chamber 10 through the film path 89. The bottom lid 85 is provided with a film holding member 85a for holding the photo filmstrip 12 in a curvature shape under the exposure chamber 83.

Figure 2:
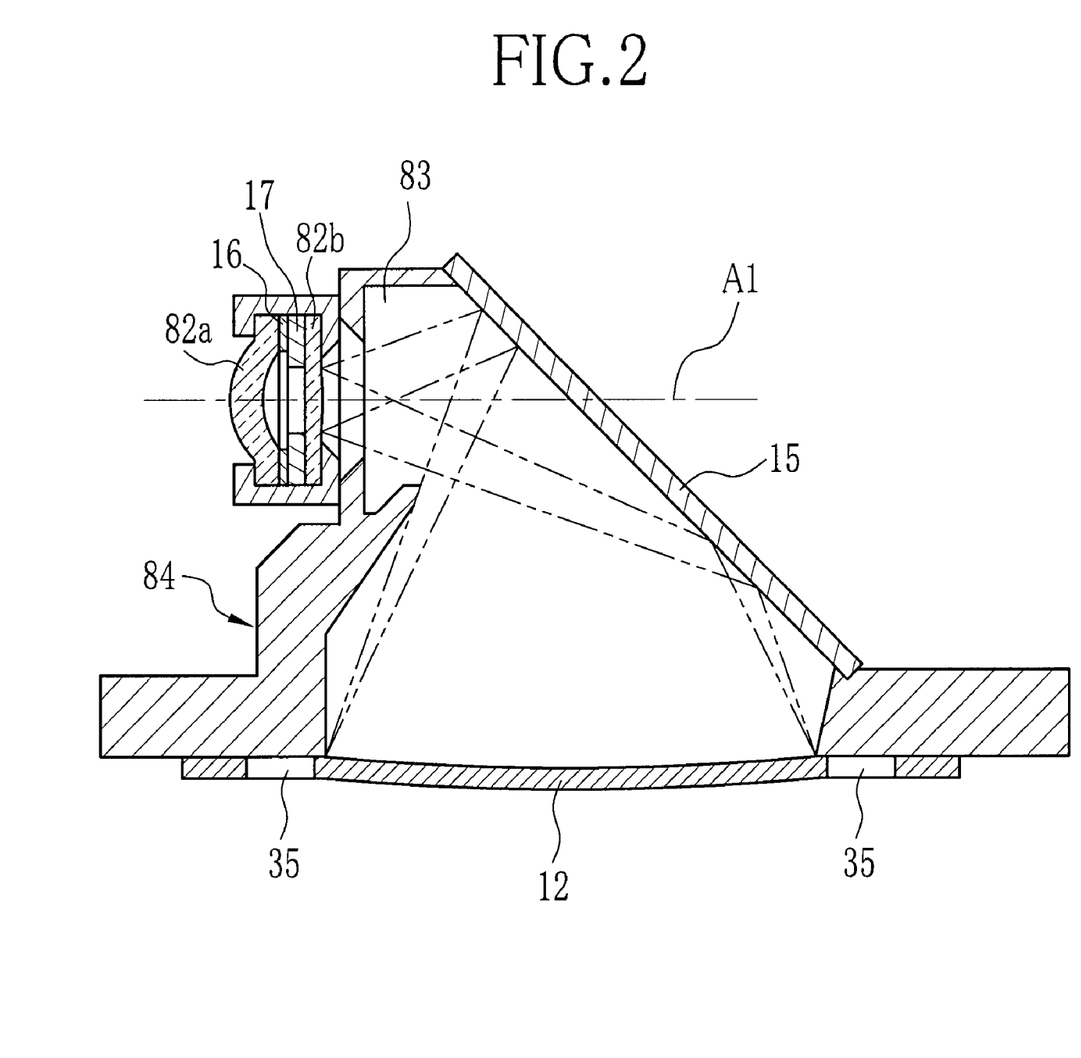
FIG. 2 is a sectional view of an exposure chamber.

Referring to FIG. 2, a plane mirror 15 is disposed in the exposure chamber 83 in such a manner as to be inclined 45 degrees with respect to an optical axis A1 of the taking lens 82. The plane mirror 15 reflects subject light passing through the taking lens 82. Subject light perpendicularly bent by the plane mirror 15 forms an optical image on the photo film 12. The taking lens 82 is composed of two lens elements 82a and 82b with positive refractive power. An anti-flare plate 16 and an aperture stop 17 are disposed between the lens elements 82a and 82b. Table 1 shows lens data of the taking lens optical system. The following abbreviations are used in Table 1.

RC: Radius of Curvature
AS: Air Space
RI: Refractive Index
DP: Dispersive Power
ER: Effective Radius
HI: Height of Incident Ray

TABLE 1

|  | RC | AS | RI | DP | ER | HI |
|---|---|---|---|---|---|---|
| Positive Lens Element 2a |  | 1.70 | 1.492 | 57.5 | 2.5 | 2.06 |
| First Surface | 4.286 | 1.70 | 1.492 |  | 2.5 | 2.06 |
| Second Surface | *4.100 | 0.82 |  |  |  |  |
| Anti-Flare Plate | Infinity | 0.17 |  |  | 1.80 | 1.80 |
| Aperture Stop | Infinity | 0.41 |  |  |  |  |
| Positive Lens Element 2b |  |  |  |  |  |  |
| Third Surface | Infinity | 0.79 | 1.492 | 57.5 |  |  |
| Fourth Surface | *−20.511 | 0.15 |  |  | 1.78 | 1.78 |
| Field Stop | 28.316 | 28.316 |  |  | 1.77 | 1.77 |
| Image Plane | −149.33 | −0.392 |  |  |  |  |

In the lens optical system, composite focal length is 33.14 mm, a half-field angle of the taking lens 82 is 34 degrees, the f-number of the aperture stop is 14, the f-number of the field stop is 8.0, and the focal length of the lens element 82a is 104.37 mm. In Table 1, second and fourth surfaces marked with asterisks (*) are aspherical refractive surfaces. The second and fourth surfaces are curved surfaces which are so designed as to satisfy the following equation:

$$Z=ch^2/[1+\{1-(1+K)c^2h^2\}^{1/2}]+Ah^4+Bh^6+Ch^8+Dh^{10}$$

wherein, c is the inverse of Radius of Curvature of a referential curved surface, and h is a distance from an optical axis. A to D are aspheric coefficients. Table 2 shows the values of A to D.

TABLE 2

|  | Second Surface | Fourth Surface |
|---|---|---|
| K | −0.66147 | 0 |
| A | 0.208782E−02 | −0.574671E−03 |
| B | 0.174335E−03 | −0.150350E−04 |
| C | 0 | 0 |
| D | 0 | 0 |

Figure 3:
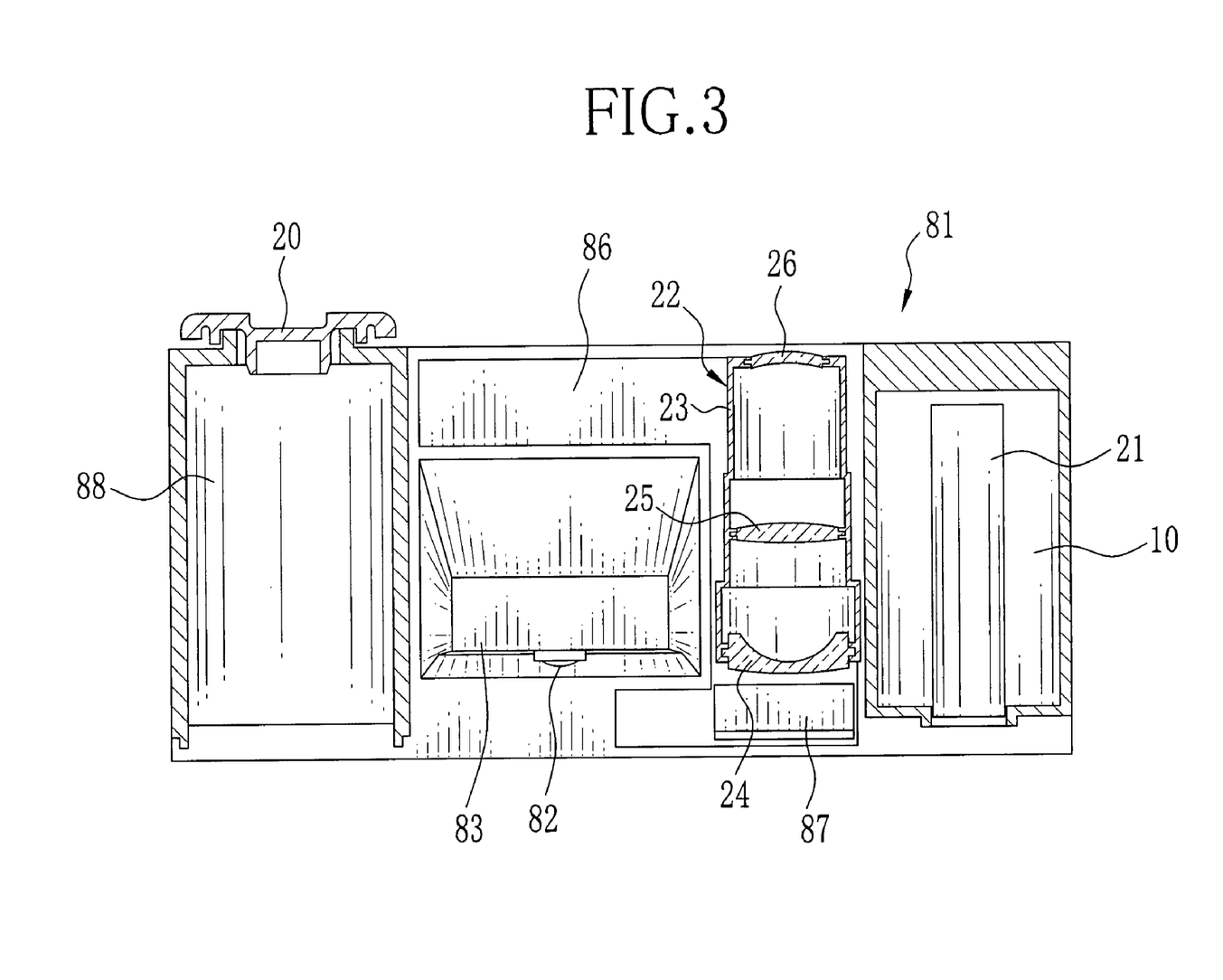
FIG. 3 is a partial cross section view of a main body of the film unit of FIG. 1.

Referring to FIG. 3, a winding dial 20 engaged with the spool 13 is provided at an end of the cartridge chamber 88. A user rotates the winding dial 20 after making each exposure to wind up the exposed photo film 12 by one picture frame. A main capacitor 21 is so disposed in the middle of the film roll chamber 10 that the photo filmstrip 12 is wound around the main capacitor 21. An approximately L-shaped flash circuit board 86 is disposed around the exposure chamber 83 in parallel with the photo film 12.

On the flash circuit board 86, a viewfinder 22 is provided behind the flash projector 87. The viewfinder 22 comprises a frame 23 and three finder lens elements held in the frame 23. More specifically, the finder lens is composed of an objective lens element 24 with negative refractive power, a first eyepiece lens element 25, and a second eyepiece lens element 26 which are disposed in this order from an objective side. Since the viewfinder 22 is an inverted Galilean finder, composite refractive power of the first and second eyepiece lens elements 25 and 26 becomes positive.

Figure 4:
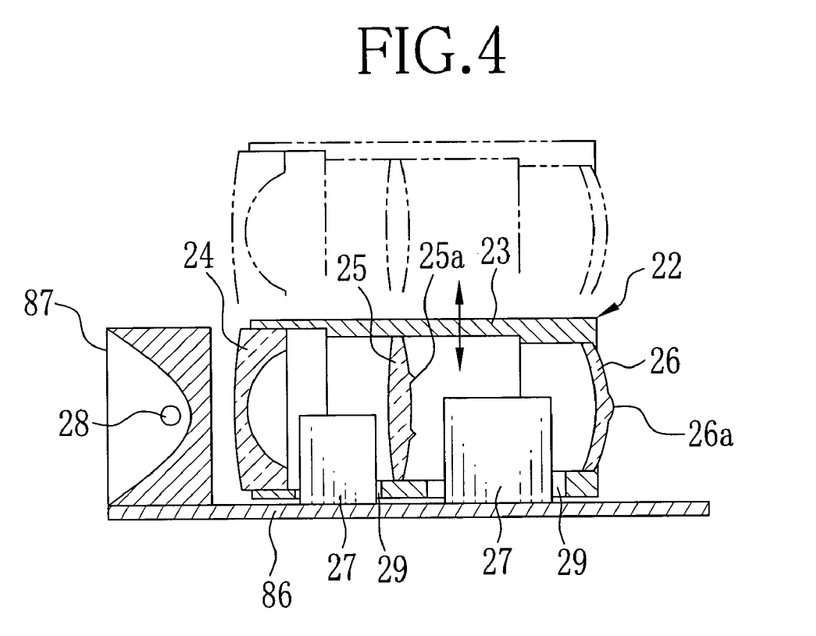
FIG. 4 is a longitudinal sectional view of a finder unit.

Referring to FIG. 4, the flash projector 87 and a flash circuit elements 27 such as a step-up transformer are attached on the flash circuit board 86. A xenon tube 28 is disposed in the flash projector 87. Upon discharging electricity from the main capacitor 21, the xenon tube 28 emits a flashlight. The flash circuit elements 27 get into the viewfinder 22 through openings 29 formed in the bottom surface of the frame 23. One of the flash circuit elements 27 is disposed between the objective lens element 24 and the first eyepiece lens element 25, and the other element 27 is disposed between the first and second eyepiece lens elements 25 and 26.

The viewfinder 22 is manually movable in a perpendicular direction by a slide mechanism (not illustrated). When the viewfinder 22 is in a position illustrated with solid lines in FIG. 4, the viewfinder 22 is unavailable because the flash projector 87 and the flash circuit elements 27 obstruct a finder optical path of the viewfinder 22. In using the viewfinder 22, the viewfinder 22 is moved upward to a position illustrated with chain double-dashed lines to retract the flash projector 87 and the flash circuit elements 27 from the finder optical path. A spring may be provided in the viewfinder 22 to move the viewfinder 22 with a single motion. When the viewfinder 22 is not used, the flash circuit elements 27 are disposed in the finder optical path, so that it is possible to make effective use of space inside the viewfinder 22.

Figure 5:
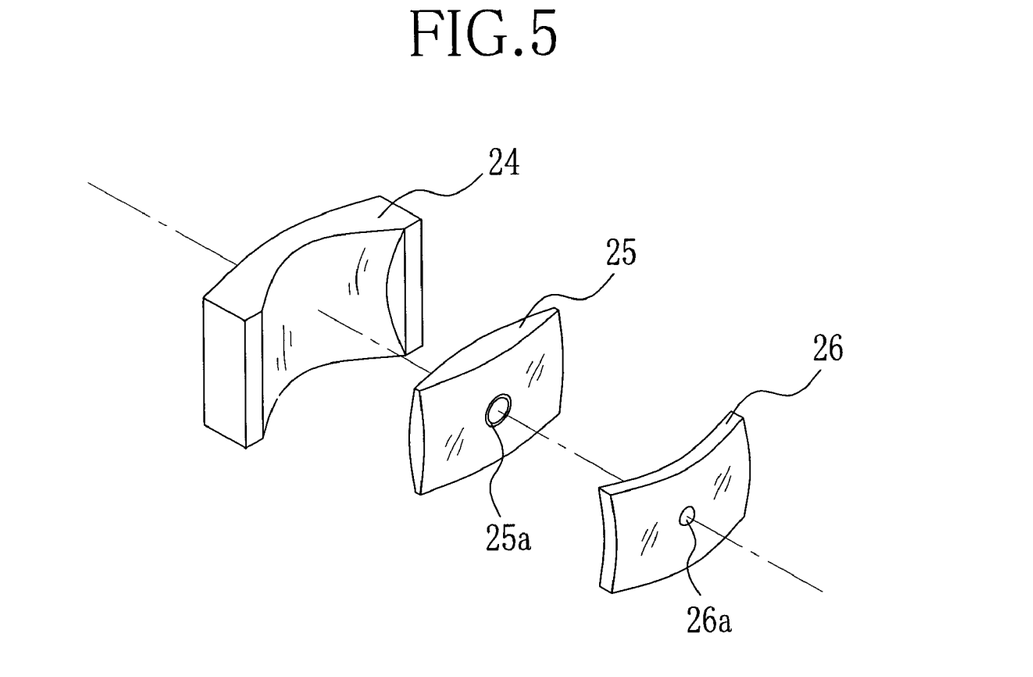
FIG. 5 is a perspective view of a finder optical system.

Referring to FIG. 5, a target mark 25a is formed in a refractive surface on the pupil side of the first eyepiece lens element 25. The target mark 25a is a ring-shaped projection the center of which is in an optical axis of the viewfinder 22. The target mark 25a is triangular in cross section. A micro lens 26a is integrally provided on the pupil side of the second eyepiece lens element 26. Incident subject light to the objective lens 24 passes through the first eyepiece lens element 25. Apart of subject light is reflected by the objective surface of the second eyepiece lens element 26. A part of the reflected subject light reaching the target mark 25a illuminates the target mark 25a. When the user looks into the viewfinder 22 from a micro lens 26a side, a virtual image of the target mark 25a appears as a ring-shaped bright line which overlaps with an optical image of the subject. The target mark 25a may take another shape.

Each lens element 24, 25 or 26 is so designed as to satisfy the following equations:

$$W > 26 \text{ mm}$$

$$0.2 < (L/W) < 0.7$$

$$P1 > |P2|$$

wherein, W is the thickness of the viewfinder 22, namely the apex distance between a refractive surface on the objective side of the objective lens element 24 and a refractive surface on the pupil side of the second eyepiece lens element 26 in a finder optical axis. L represents the length (expressed in mm) between the pupil side surface of the objective lens element 24 and the objective side surface of the first eyepiece lens element 25. P1 and P2 are the refractive power of the first and second eyepiece lens elements 25 and 26, respectively.

The refractive power P1 of the first eyepiece lens element 25, disposed on the objective side, is larger than the absolute value of the refractive power P2 of the second eyepiece lens element 26, disposed on the pupil side. Accordingly, it is possible to obtain a fine field of view of the viewfinder 22 without enlarging the aperture size of the viewfinder 22 and the diameter of the finder lens.

The objective lens element 24 may be disposed in the front wall of the film unit 81, and the second eyepiece lens element 26 may be disposed in the rear wall thereof. In this case, since the distance from photographer's eyes to the second eyepiece lens element 26 becomes short, the photographer can clearly observe the virtual image of the target mark 25a appearing on a lens surface. Especially when each lens element composing the view finder 22 satisfies the equation of 0.2<(L/W)<0.7, the target mark 25a is magnified with proper magnifying power. Thereby, it is possible to prevent flare due to target mark 25a. This results in favorable finder performance.

Figure 6:
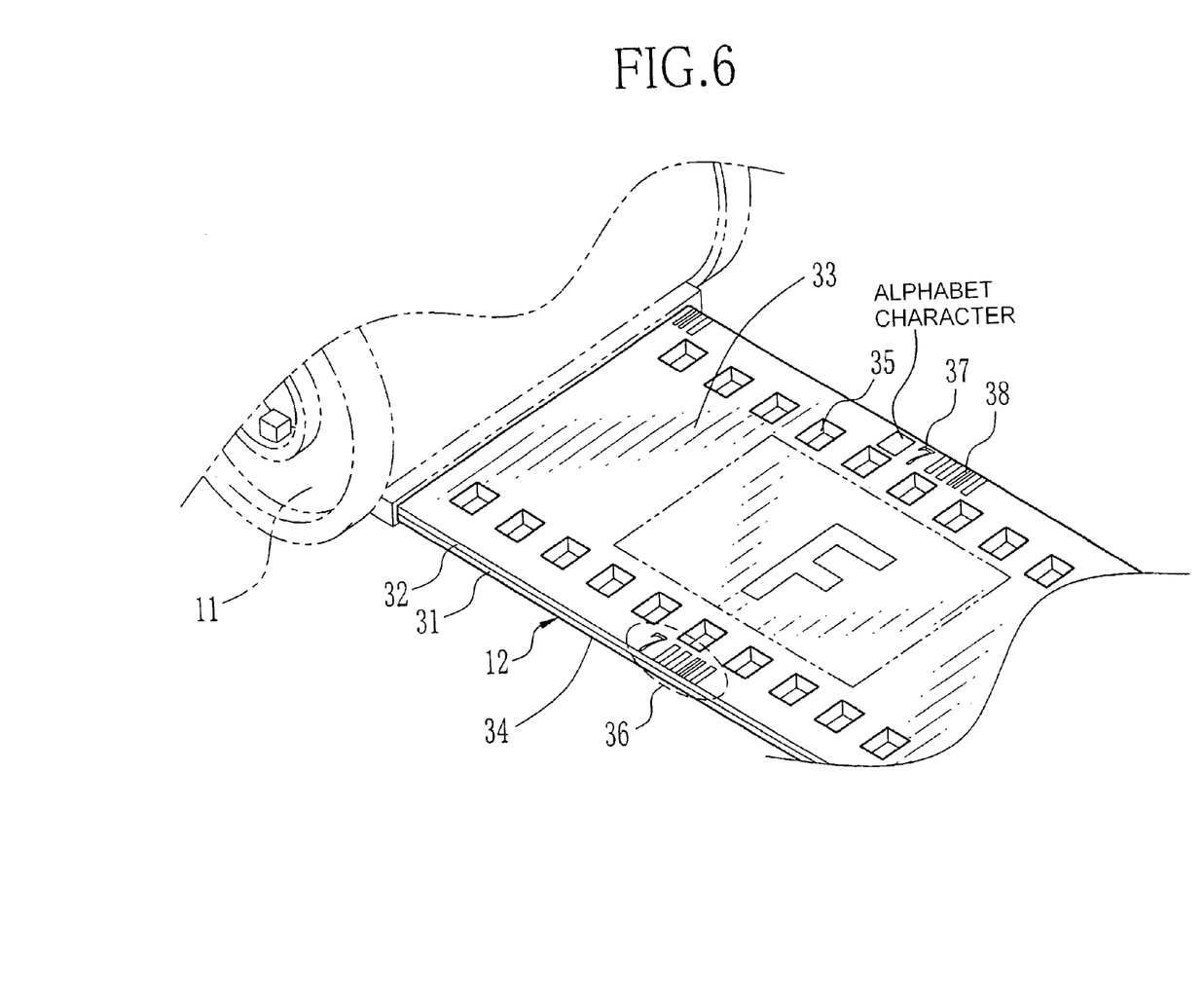
FIG. 6 is an explanatory view of side prints recorded as latent images.
Figure 7:
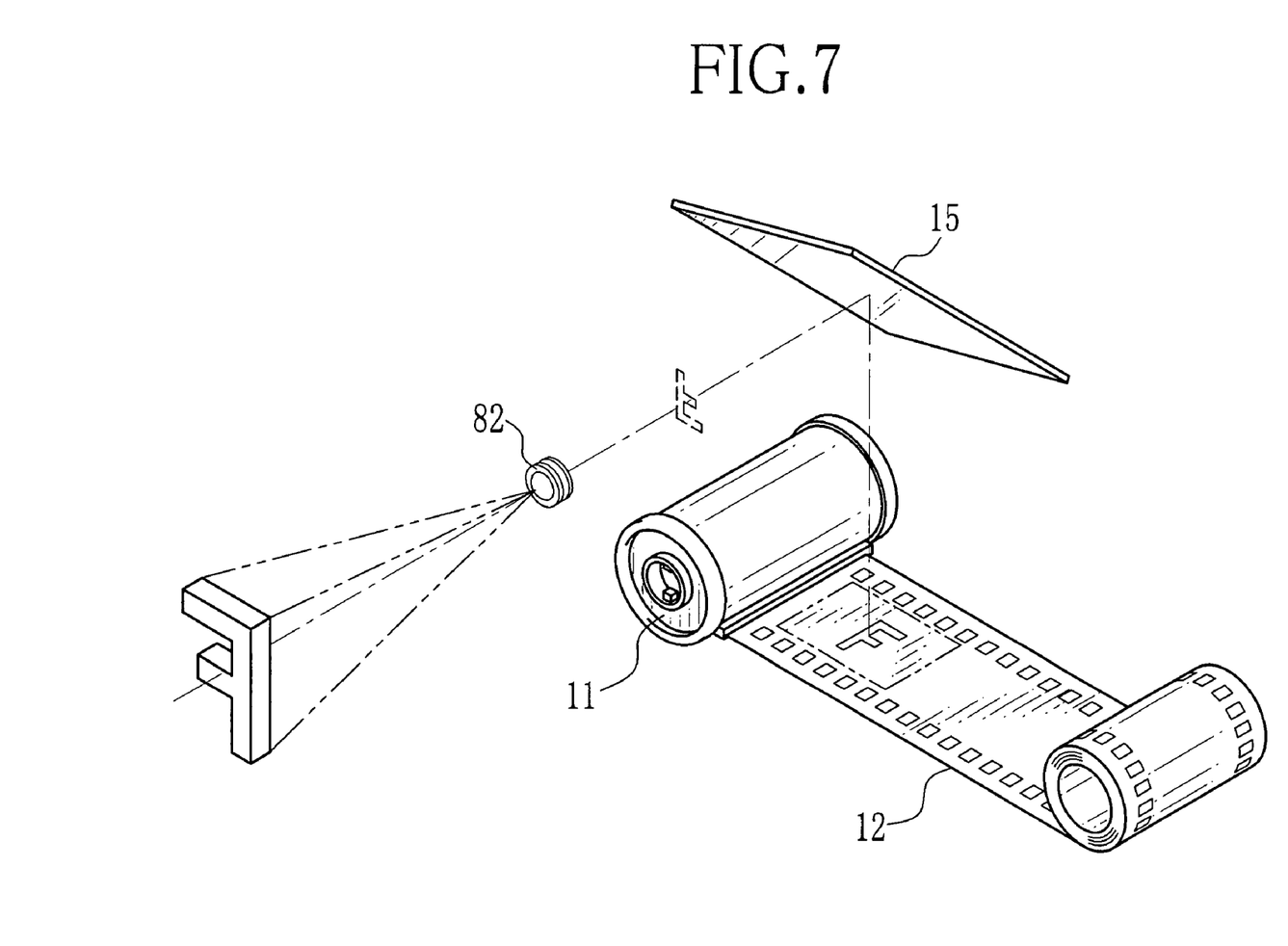
FIG. 7 is a perspective view explaining the positional relation between a photographic optical system and a photographed image.

The photo film 12, as shown in FIGS. 6 and 7, comprises a film base 31 and a photographic emulsion layer 32 coated on the film base 31. The photo film 12 is disposed approximately in parallel with an optical axis Al of the taking lens 82, in such a manner that the side of the photographic emulsion layer 32 (hereinafter called an emulsion surface 33) is opposed to the plane mirror 15. The bottom lid 85 holds the photo film 12 by the side of the film base 31 (hereinafter called a film base surface 34).

In the photo film 12, side prints 36 of each photo frame are printed in advance on the outside of perforations 35 formed outside the corresponding photo frame. The side print 36 includes a number 37 indicating a frame number, and a barcode 38 indicating ID information of the photo film 12. The side print 36 recorded as a latent image in manufacturing becomes visible after development. The side print 36 may include information of the type of photo film, a lot number, an alphabet and number indicating a film maker and the like, in addition to the number 37 and the barcode 38.

The side print 36 is recorded in the emulsion surface 33 of the photo film 12. Giving attention to a character which is not vertically symmetric, for example "7", as shown in FIG. 6, the orientation of "7" is correct in the emulsion surface 33.

Taking a case of photographing an F-shaped subject, for example, subject light, passing through the taking lens 82 and reflected by the plane mirror 15, is incident on the emulsion surface of the photo film 12. Subject light forms an optical image of the subject in such a manner that the orientation of "F" becomes correct in the emulsion surface 33. In other words, the orientation of the photographed image is the same as that of the side prints 36.

After making exposures to the predetermined number of picture frames, the cartridge shell 11 taken out of the film unit 81 is sent to a photo-lab. In the photo-lab, the photo film 12 used in the film unit 81 is subject to development and print processes, together with photo films used in ordinary cameras. In the photo-lab, the photo filmstrip drawn out of each cartridge shell is set on the same direction. A well-known splicer joins the plural photo filmstrips to one another in a longitudinal direction. The photo film 12 used in the film unit 81 and those used in the ordinary cameras are mixed in a joined photo filmstrip.

The joined photo filmstrip is subject to a developing process. In completing the developing process, the images and side prints recorded on the photo film 12 are horizontally or vertically flipped relative to those recorded in a normal photo film. Then, the joined photo filmstrip is sent to a digital printer.

Figure 8:
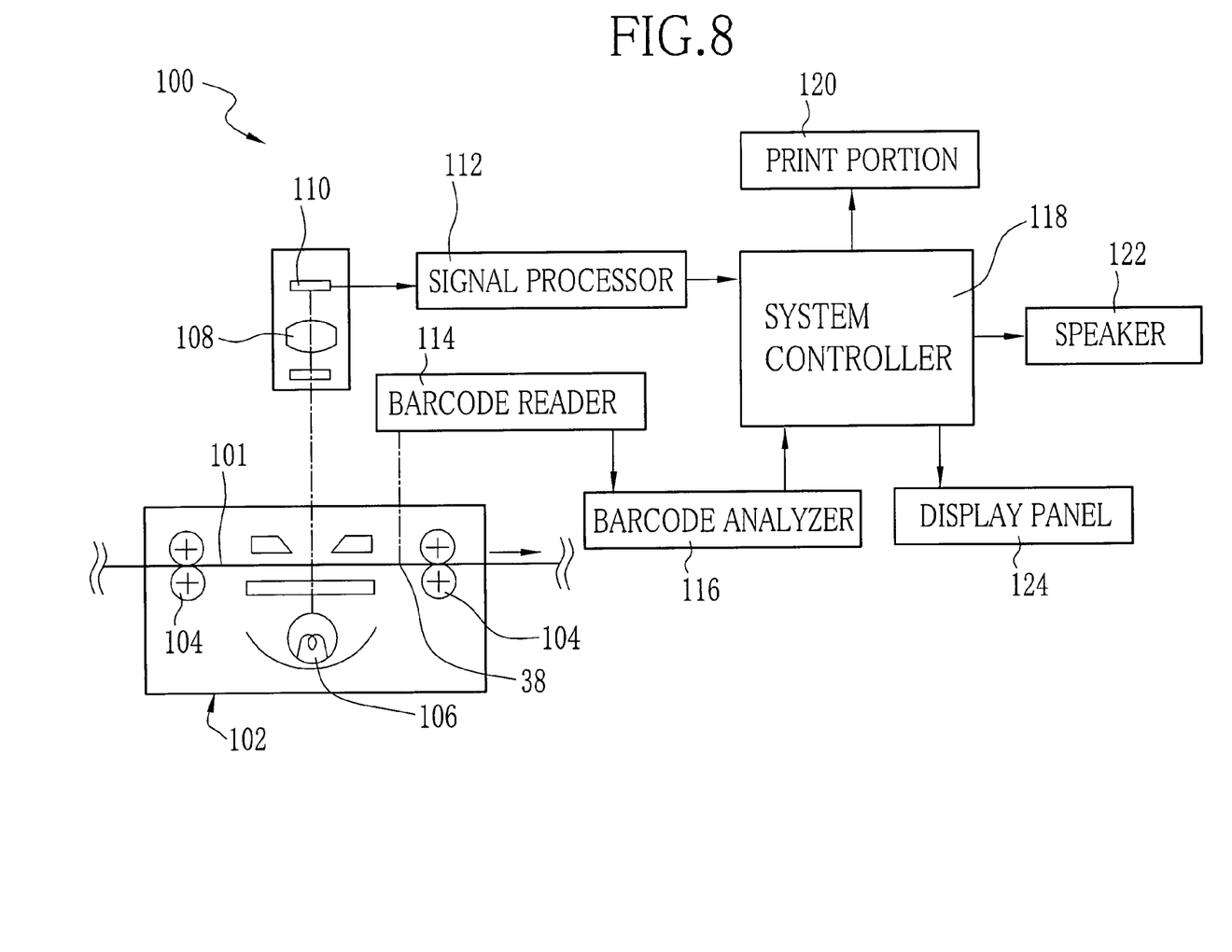
FIG. 8 is a schematic block diagram of a digital printer.

FIG. 8 schematically shows the structure of a digital printer 100. The joined photo filmstrip 101 set on a film carrier 102 is carried in the direction shown by the arrow in FIG. 8 by a pair of feed rollers 104. A light source 106 disposed under the film carrier 102 irradiates the joined photo filmstrip 101 with light. An image forming lens 108 focuses the light passing through the photo filmstrip 101 on a line sensor 110. The line sensor 110 comprises plural photo sensors arranged in a width direction of the photo filmstrip 101 to scan the image in each frame line-by-line. Image signals obtained by scanning are sent to a signal processor 112 to be converted into image data of the scanned image. Then, image data is subject to predetermined image correction processes.

A barcode reader 114 optically scans the barcode 38 in the photo filmstrip 101, and sends barcode image data to a barcode analyzer 116. The barcode analyzer 116 judges whether the barcode image format of the scanned barcode 38 agrees with a pre-registered format. In the event of agreement, the barcode analyzer 116 converts the barcode image data into number data and send number data to a system controller 118. In the event of disagreement, the barcode analyzer 116 flips the barcode image into a mirror image for the purpose of re-judgment. Numerically converted barcode data includes information indicating the type of photo film, film speed and the like.

A system controller 118 controls the operation of the digital printer 100. The system controller 118 sends the film information and image data of each frame to a print portion 120 with an image print command. The print portion 120 corrects the images on the basis of correction data corresponding to the film information, and then prints the images by use of a well-known exposure head. When the barcode reader 114 cannot read the flipped barcode image data, the system controller 118 outputs error sound through a speaker 122, or displays an error message on a display panel 124.

Figure 9:
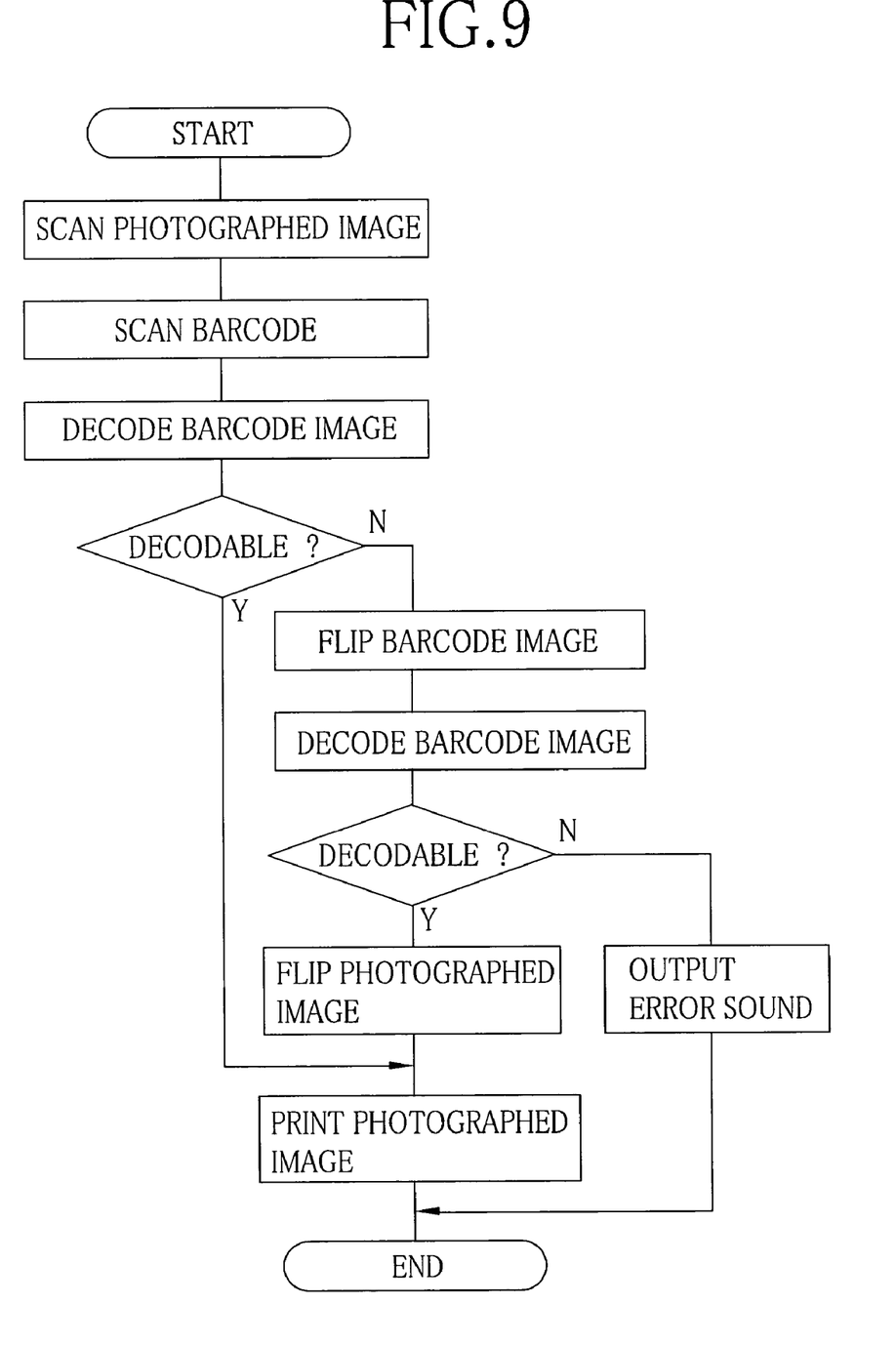
FIG. 9 is a flow chart showing a printing process of the digital printer.

FIG. 9 shows the flow of processes of the digital printer 100. When the developed photo film is sent to the digital printer 100, the digital printer 100 scans the photographed images and barcodes recorded in each photo film.

The digital printer 100 decodes the barcode in correct orientation to generate barcode image data, which is converted into the film information. Image data is corrected on the basis of image correction data corresponding to the film information. Then, the images are printed on a photographic paper.

The barcode 38 recorded in the photo film 12 used in the film unit 81 according to this embodiment, on the other hand, is undecodable because it has been flipped. In this case, the scanned barcode image is flipped and re-decoded. If the flipped barcode image is properly decoded, the digital printer 100 recognizes that the photo film 12 is also flipped. Accordingly, the photographed images are printed on the photographic paper in correct orientations with turning them upside down. If the barcode 38 is undecodable even after flipping, the digital printer 100 outputs the error sound, or display the error message to inform the user of the occurrence of an error.

In the foregoing digital printer 100, as described above, it is possible to deal with the photo film 12 used in the film unit 81 together with the photo films used in the ordinary cameras. Accordingly, it is possible to efficiently carry out developing and printing processes without additional time and effort.

In the photo film 12, as described above, the orientation of the photographed image is the same as that of the side print 36. Accordingly, confirming the orientation of the side print 36 makes it possible to easily confirm the orientation of the image, when, for example, an extra printing process is carried out.

In the above embodiment, the main capacitor 21 is provided in the film roll chamber 10, but it is possible to substitute a dry battery for the main capacitor 21. Using the taking lens 82 with large f-number and a high-speed photo film 12 makes it possible to reduce the guide number of the flash mechanism 90. In this case, the main capacitor may have lower capacity, or the dry battery may have lower power. The size of the main capacitor or the dry battery becomes small, so that the size of the film roll chamber 10 decreases. A fuel cell made out of carbon nanotubes, which is a potential power source of miniature size, may be used as the power source of the flash mechanism 90.

Referring to FIGS. 10 to 16, embodiments of viewfinders, which are properly applicable to the lens-fitted photo film unit 81, will be hereinafter described. The film unit 81, as described above, is provided with the viewfinder which comprises the objective lens element with negative refractive power and two eyepiece lens elements.

FIRST EMBODIMENT

Figure 10:
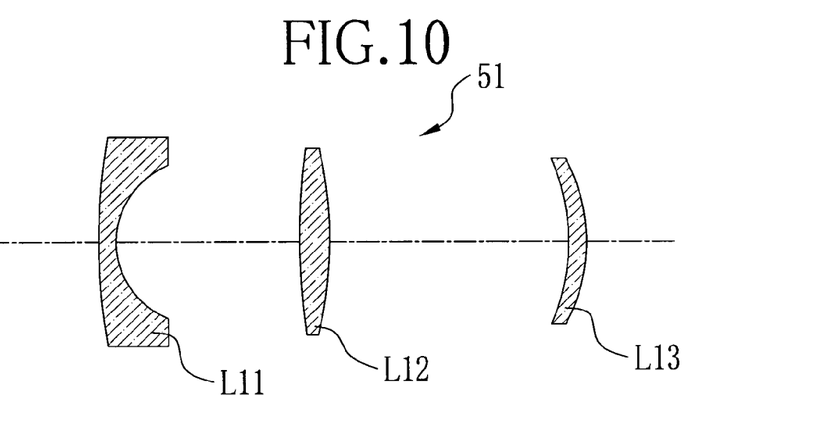
FIG. 10 is an explanatory view of a viewfinder according to the first embodiment.

Referring to FIG. 10, the viewfinder 51 comprises a negative meniscus lens L11 as the objective lens element, a biconvex lens L12 as the first eyepiece lens element, and a positive meniscus lens L13 as the second eyepiece lens element. The focal length of the objective lens element L11, the first eyepiece lens element L12, and the second eyepiece lens element L13 is denoted as F11, F12, and F13, respectively. The values of F11 to F13 are as follows:

$F11=-15.77$ mm $F12=41.88$ mm $F13=203.33$ mm

Table 3 shows lens data of the viewfinder 51. The same abbreviations as Table 1 are used in Table 3.

TABLE 3

|  | RC | AS | RI | DP |
|---|---|---|---|---|
| First Surface | 56.314 | 1.60 | 1.585 | 29.9 |
| Second Surface | *7.843 | 16.93 |  |  |
| Third Surface | 65.159 | 2.76 | 1.585 | 29.9 |
| Fourth Surface | *−38.654 | 22.11 |  |  |
| Fifth Surface | −19.238 | 1.60 | 1.585 | 29.9 |
| Sixth Surface | *−17.068 |  |  |  |

In Table 3, Radius of Curvature (RC) and Air Space (AS) are expressed in millimeter (mm). Refractive Index (RI) and Dispersive Power (DP) are obtained with respect to D line (the wavelength is 587.5 nm). Surfaces marked with asterisks (*) are aspherical refractive surfaces, which satisfy the following equation:

$$Z=ch^2/[1+\{1-(1+K)c^2h^2\}^{1/2}]+Ah^4+Bh^6+Ch^8+Dh^{10}$$

wherein, c is the inverse of Radius of Curvature of a referential curved surface, and h is a distance from the optical axis. In each of the three lens elements comprising the viewfinder 51, a pupil side surface is aspherical. Table 4 shows aspheric coefficients of the second, fourth, and sixth surfaces.

TABLE 4

|  | Second Surface | Fourth Surface | Sixth Surface |
|---|---|---|---|
| K | −0.80897 | 0 | 0 |
| A | 0.489237E-4 | −0.289857E-5 | 0.138967E-4 |
| B | 0.315286E-5 | −0.758776E-8 | 0.109436E-6 |
| C | −0.410658E-7 | 0 | 0 |
| D | 0.220115E-9 | 0 | 0 |

In this example, L is defined as the length between the pupil side surface of the objective lens element L11 and the objective side surface of the first eyepiece lens element L12. That is, L is equal to Air Space between the second and third surfaces. Thus, the following is apparent from table 3.

L=16.93 mm

The width W of the viewfinder 51 is equal to the apex distance between the objective side surface of the objective lens element L11 and the pupil side surface of the second eyepiece lens element L12, in the optical axis of the viewfinder 51. Namely, the width W is equal to the total of Air Space from the first to the sixth surfaces.

W=45 mm

As a consequence, the viewfinder 51 satisfies the following equation:

W>26

0.2<(L/W)=0.376<0.7

The refractive power of the first and second eyepiece lens elements L12 and L13 is denoted as P1 and P2, respectively. The refractive power is expressed as the inverse of the focal length of each lens element, so that the refractive power P1 and P2 satisfies the following equation:

P1>|P2|

In the viewfinder 51, as described above, the width W is more than 26 mm. The length L between the pupil side surface of objective lens element L11 and the objective side surface of the first eyepiece lens element L12 is from 0.2 to 0.7 times as long as the width W.

SECOND EMBODIMENT

Figure 11:
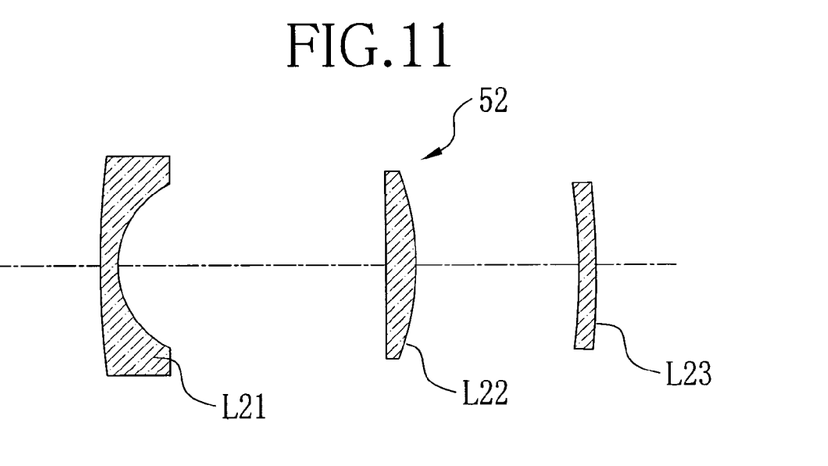
FIG. 11 is an explanatory view of a viewfinder according to the second embodiment.

Referring to FIG. 11, the viewfinder 52 comprises a negative meniscus lens L21 as the objective lens element, a biconvex lens L22 as the first eyepiece lens element, and a negative meniscus lens L23 as the second eyepiece lens element. The focal length of the objective lens element L21, the first eyepiece lens element L22, and the second eyepiece lens element L23 is denoted as F21, F22, and F23, respectively. The values of F21 to F23 are as follows:

F21=−16.35 mm

F22=38.198 mm

F23=−500.34 mm

Accordingly, the refractive power of the first eyepiece lens element L22 is larger than the absolute value of the refractive power of the second eyepiece lens element L23.

Table 5 shows lens data of the viewfinder 52, and Table 6 shows aspheric coefficients.

TABLE 5

|  | RC | AS | RI | DP |
|---|---|---|---|---|
| First Surface | 88.692 | 1.60 | 1.585 | 29.9 |
| Second Surface | *8.576 | 22.95 | | |
| Third Surface | 2619.568 | 3.00 | 1.585 | 29.9 |
| Fourth Surface | *−22.529 | 15.85 | | |
| Fifth Surface | −19.795 | 1.60 | 1.585 | 29.9 |
| Sixth Surface | *−21.865 | | | |

TABLE 6

|  | Second Surface | Fourth Surface | Sixth Surface |
|---|---|---|---|
| K | −0.921462 | 0 | 0 |
| A | 0.798820E−4 | −0.456501E−5 | −0.106992E−4 |
| B | 0.100753E−5 | 0.206720E−8 | 0.104800E−6 |
| C | −0.108025E−7 | 0 | 0 |
| D | 0.676391E−10 | 0 | 0 |

The length L between the pupil side surface of the objective lens element L21 and the objective side surface of the first eyepiece lens element L22, and the width W of the viewfinder 52 are calculated from Tables 5 and 6.

L=22.95 mm

W=45 mm

As a consequence, the viewfinder 52 satisfies the following equation:

P1>|P2|

W>26

0.2<(L/W)=0.51<0.7

THIRD EMBODIMENT

Figure 12:
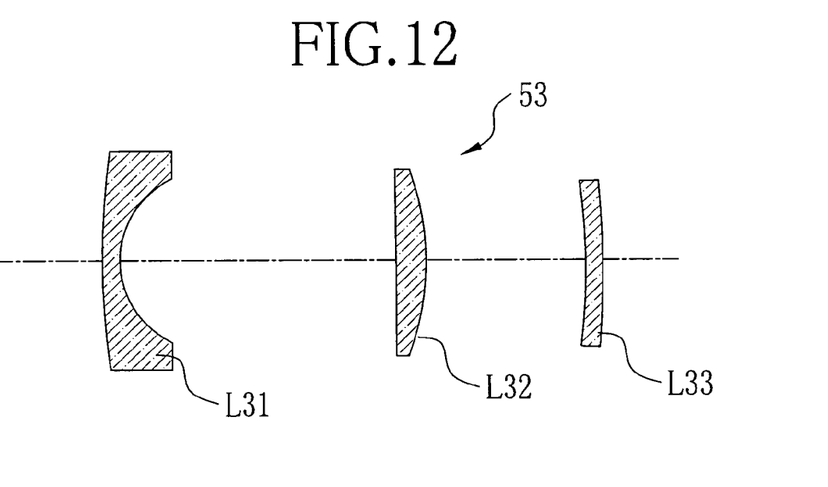
FIG. 12 is an explanatory view of a viewfinder according to the third embodiment.

Referring to FIG. 12, the viewfinder 53 comprises a negative meniscus lens L31 as the objective lens element, a positive meniscus lens L32 as the first eyepiece lens element, and a negative meniscus lens L33 as the second eyepiece lens element. The focal length of the objective lens element L31, the first eyepiece lens element L32, and the second eyepiece lens element L33 is denoted as F31, F32, and F33, respectively. The values of F31 to F33 are as follows:

F31=−16.79 mm

F32=36.63 mm

F33=−200.00 mm

Accordingly, the refractive power of the first eyepiece lens element L32 is larger than the absolute value of the refractive power of the second eyepiece lens element L33. Table 7 shows lens data of the viewfinder 53, and Table 8 shows aspheric coefficients.

TABLE 7

|  | RC | AS | RI | DP |
|---|---|---|---|---|
| First Surface | 72.902 | 1.60 | 1.585 | 29.9 |
| Second Surface | *8.590 | 25.49 | | |
| Third Surface | −2386.248 | 3.00 | 1.585 | 29.9 |
| Fourth Surface | *−21.249 | 13.31 | | |
| Fifth Surface | −25.239 | 1.60 | 1.585 | 29.9 |
| Sixth Surface | *−32.934 | | | |

TABLE 8

|  | Second Surface | Fourth Surface | Sixth Surface |
|---|---|---|---|
| K | −0.914061 | 0 | 0 |
| A | 0.840892E−4 | 0.871457E−6 | −0.151478E−4 |
| B | 0.805040E−6 | 0.111262E−7 | 0.125132E−6 |
| C | −0.708918E−8 | 0 | 0 |
| D | 0.506927E−10 | 0 | 0 |

The length L between the pupil side surface of the objective lens element L31 and the objective side surface of the first eyepiece lens element L32, and the width W of the viewfinder 53 are calculated from Tables 7 and 8.

L=25.49 mm

W=45 mm

As a consequence, the viewfinder 53 satisfies the following equation:

$P1>|P2|$ $W>26$ $0.2<(L/W)=0.566<0.7$

FOURTH EMBODIMENT

Figure 13:
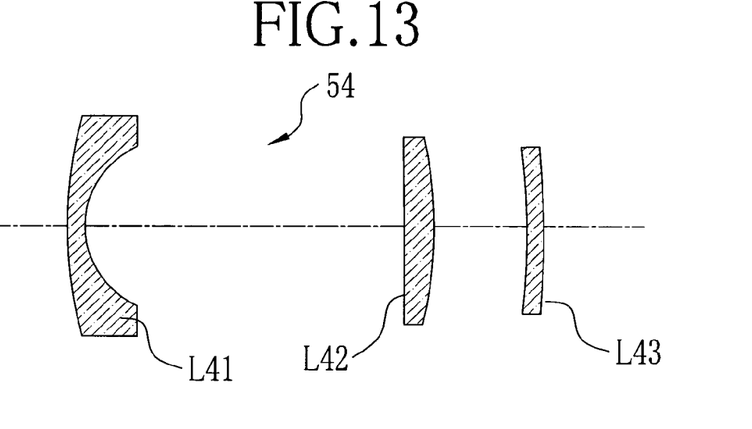
FIG. 13 is an explanatory view of a viewfinder according to the fourth embodiment.

Referring to FIG. 13, the viewfinder 54 comprises a negative meniscus lens L41 as the objective lens element, a biconvex lens L42 as the first eyepiece lens element, and a negative meniscus lens L43 as the second eyepiece lens element. The focal length of the objective lens element L41, the first eyepiece lens element L42, and the second eyepiece lens element L43 is denoted as F41, F42, and F43, respectively. The values of F41 to F43 are as follows:

$F41=-17.96$ mm

F42=33.96 mm $F43=-100.1$ mm

Accordingly, the refractive power of the first eyepiece lens element L42 is larger than the absolute value of the refractive power of the second eyepiece lens element L43.

Table 9 shows lens data of the viewfinder 54, and Table 10 shows aspheric coefficients.

TABLE 9

|  | RC | AS | RI | DP |
|---|---|---|---|---|
| First Surface | *40.144 | 1.60 | 1.585 | 29.9 |
| Second Surface | 8.205 | 29.51 |  |  |
| Third Surface | 409.720 | 3.00 | 1.585 | 29.9 |
| Fourth Surface | *-20.824 | 9.29 |  |  |
| Fifth Surface | -42.751 | 1.60 | 1.585 | 29.9 |
| Sixth Surface | -160.576 |  |  |  |

TABLE 10

|  | First Surface | Fourth Surface |
|---|---|---|
| K | -0.861071 | 0 |
| A | 0.935570E-4 | -0.401209E-6 |
| B | 0.103753E-5 | 0.530202E-7 |
| C | -0.664726E-8 | 0 |
| D | 0.616186E-10 | 0 |

The length L between the pupil side surface of the objective lens element L41 and the objective side surface of the first eyepiece lens element L42, and the width W of the viewfinder 54 are calculated from Tables 9 and 10.

L=29.51 mm

W=45 mm

As a consequence, the viewfinder 54 satisfies the following equation:

$P1>|P2|$ $W>26$ $0.2<(L/W)=0.656<0.7$

FIFTH EMBODIMENT

Figure 14:
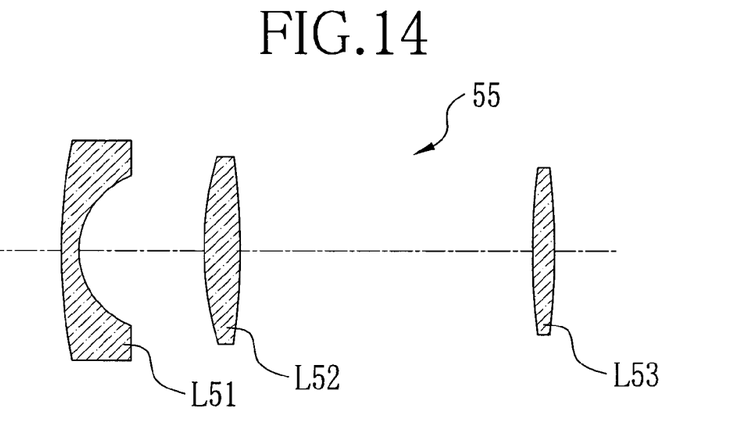
FIG. 14 is an explanatory view of a viewfinder according to the fifth embodiment.

Referring to FIG. 14, the viewfinder 55 comprises a negative meniscus lens L51 as the objective lens element, a biconvex lens L52 as the first eyepiece lens element, and a biconvex lens L53 as the second eyepiece lens element. The focal length of the objective lens element L51, the first eyepiece lens element L52, and the second eyepiece lens element L53 is denoted as F51, F52, and F53, respectively. The values of F51 to F53 are as follows:

$F51=-15.15$ mm

F52=43.67 mm

F53=100.00 mm

Accordingly, the refractive power of the first eyepiece lens element L52 is larger than the absolute value of the refractive power of the second eyepiece lens element L53.

Table 11 shows lens data of the viewfinder 55, and Table 12 shows aspheric coefficients.

TABLE 11

|  | RC | AS | RI | DP |
|---|---|---|---|---|
| First Surface | 53.725 | 1.60 | 1.585 | 29.9 |
| Second Surface | *7.528 | 11.49 |  |  |
| Third Surface | 31.492 | 3.00 | 1.585 | 29.9 |
| Fourth Surface | *-130.585 | 27.31 |  |  |
| Fifth Surface | 61.831 | 1.60 | 1.585 | 29.9 |
| Sixth Surface | -1076.074 |  |  |  |

TABLE 12

|  | Second Surface | Fourth Surface |
|---|---|---|
| K | -0.784428 | 0 |
| A | 0.496037E-4 | -0.449311E-4 |
| B | 0.343593E-5 | -0.519121E-7 |
| C | -0.389468E-7 | 0 |
| D | 0.179320E-9 | 0 |

The length L between the pupil side surface of the objective lens element L51 and the objective side surface of the first eyepiece lens element L52, and the width W of the viewfinder 55 are calculated from Tables 11 and 12.

L=11.49 mm

W=45 mm

As a consequence, the viewfinder 52 satisfies the following equation:

$P1>|P2|$ $W>26$ $0.2<(L/W)=0.255<0.7$

SIXTH EMBODIMENT

Figure 15:
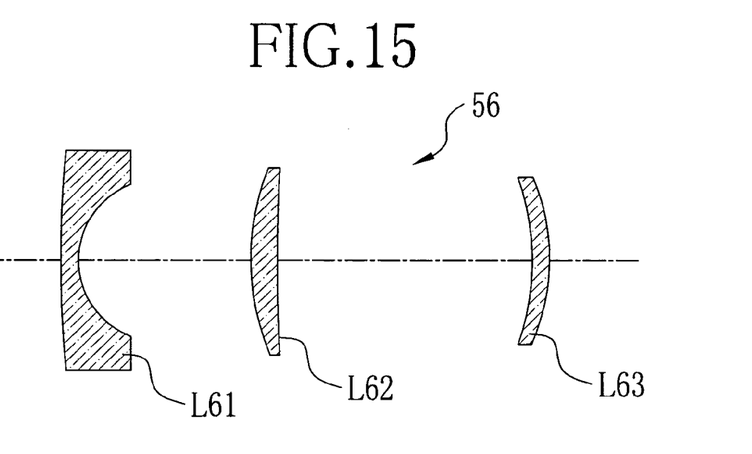
FIG. 15 is an explanatory view of a viewfinder according to the sixth embodiment.

Referring to FIG. 15, the viewfinder 56 comprises a negative meniscus lens L61 as the objective lens element, a positive meniscus lens L62 as the first eyepiece lens element, and a positive meniscus lens L63 as the second eyepiece lens element. The focal length of the objective lens element L61, the first eyepiece lens element L62, and the second eyepiece lens element L63 is denoted as F61, F62, and F63, respectively. The values of F61 to F63 are as follows:

$F61=-14.23$ mm $F62=36.69$ mm $F63=200.7$ mm

Accordingly, the refractive power of the first eyepiece lens element L62 is larger than the absolute value of the refractive power of the second eyepiece lens element L63.

Table 13 shows lens data of the viewfinder 56, and Table 14 shows aspheric coefficients.

TABLE 13

|  | RC | AS | RI | DP |
|---|---|---|---|---|
| First Surface | 109.191 | 1.60 | 1.585 | 29.9 |
| Second Surface | *7.693 | 16.16 |  |  |
| Third Surface | 19.413 | 2.90 | 1.585 | 29.9 |
| Fourth Surface | 192.016 | 22.74 |  |  |
| Fifth Surface | −23.248 | 1.60 | 1.585 | 29.9 |
| Sixth Surface | *−19.899 |  |  |  |

TABLE 14

|  | Second Surface | Sixth Surface |
|---|---|---|
| K | −0.876203 | 0 |
| A | 0.198670E−4 | 0.142525E−4 |
| B | 0.229502E−5 | 0.486900E−6 |
| C | −0.402528E−7 | 0 |
| D | 0.241904E−9 | 0 |

The length L between the pupil side surface of the objective lens element L61 and the objective side surface of the first eyepiece lens element L62, and the width W of the viewfinder 56 are calculated from Tables 13 and 14.

$L=16.16$ mm $W=45$ mm

As a consequence, the viewfinder 56 satisfies the following equation:

$P1>|P2|$ $W>26$ $0.2<(L/W)=0.359<0.7$

SEVENTH EMBODIMENT

Figure 16:
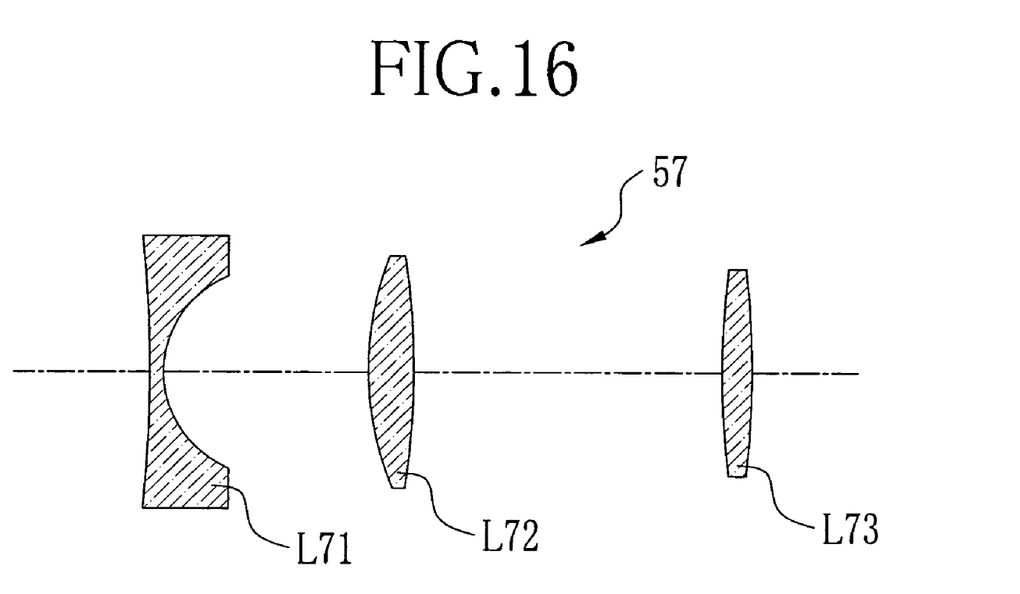
FIG. 16 is an explanatory view of a viewfinder according to the seventh embodiment.

Referring to FIG. 16, the viewfinder 57 comprises a biconcave lens L71 as the objective lens element, a biconvex lens L72 as the first eyepiece lens element, and a biconvex lens L73 as the second eyepiece lens element. The focal length of the objective lens element L71, the first eyepiece lens element L72, and the second eyepiece lens element L73 is denoted as F71, F72, and F73, respectively. The values of F71 to F73 are as follows:

$F71=-13.34$ mm $F72=35.04$ mm $F73=188.4$ mm

Accordingly, the refractive power of the first eyepiece lens element L72 is larger than the absolute value of the refractive power of the second eyepiece lens element L73.

Table 15 shows lens data of the viewfinder 57, and Table 16 shows aspheric coefficients.

TABLE 15

|  | RC | AS | RI | DP |
|---|---|---|---|---|
| First Surface | −674.063 | 1.60 | 1.585 | 29.9 |
| Second Surface | *7.9070 | 15.08 |  |  |
| Third Surface | 23.472 | 3.00 | 1.585 | 29.9 |
| Fourth Surface | −154.003 | 23.72 |  |  |
| Fifth Surface | 786.169 | 1.60 | 1.585 | 29.9 |
| Sixth Surface | −128.072 |  |  |  |

TABLE 16

|  | Second Surface |
|---|---|
| K | −0.930062 |
| A | 0.148182E−5 |
| B | 0.204111E−5 |
| C | −0.402226E−7 |
| D | 0.246796E−9 |

The length L between the pupil side surface of the objective lens element L71 and the objective side surface of the first eyepiece lens element L72, and the width W of the viewfinder 57 are calculated from Tables 15 and 16.

$L=15.08$ mm $W=45$ mm

As a consequence, the viewfinder 57 satisfies the following equation:

$P1>|P2|$ $W>26$ $0.2<(L/W)=0.335<0.7$

Although the present invention has been described with respect to the preferred embodiment, the preset invention is not to be limited to the above embodiment but, on the contrary, various modifications will be possible to those skilled in the art without departing from the scope of claims appended hereto.

What is claimed is:

1. A lens-fitted photo film unit comprising:
a taking lens;
a plane mirror for perpendicularly bending a photographic optical path of subject light passing through said taking lens;
a photo film disposed approximately in parallel with an optical axis of said taking lens, said photo film having a base surface and an emulsion surface, said subject light forming an image on said emulsion surface, a side print being recorded as a latent image on the edge of said photo film in such a manner as to flip vertically or horizontally in view of the side of said base surface; and a viewfinder, comprising:
   an objective lens element with negative refractive power;
   a first eyepiece lens element;
   a second eyepiece lens element;
   a target mark formed in the pupil side surface of said first eyepiece lens element; and
   a micro lens disposed in the pupil side surface of said second eyepiece lens element;
wherein said target mark enlarged by said micro lens appears in the field of view of said viewfinder; and
wherein said viewfinder satisfies the following formula:

$0.2 < L/W < 0.7$ wherein L is a length between the pupil side surface of said objective lens element and the objective side surface of said first eyepiece lens element; and
W is a width of the viewfinder.

2. A lens-fitted photo film unit as recited in claim 1, wherein said viewfinder satisfies the following formula:

$P1 > |P2|$ wherein P1 is the refractive power of said first eyepiece lens element, and P2 is the refractive power of said second eyepiece lens element.

3. The lens-fitted photo film unit as recited in claim 1, wherein said target mark is in a ring-shape form and in approximately the center of the pupil side surface of said second eyepiece lens element.

4. The lens-fitted photo film unit of claim 1, wherein the side print comprises at least one alpha-numeric character.

5. The lens-fitted photo film unit of claim 4, wherein the at least one alpha-numeric character comprises a letter and number that identify a manufacturer of the film.

6. The lens-fitted photo film unit of claim 1, wherein the side print comprises at least one character oriented so as to be viewed correctly from the emulsion side of the photo film.

7. A lens-fitted photo film unit comprising:
   a taking lens;
   a plane mirror for perpendicularly bending a photographic optical path of subject light passing through said taking lens;
   a photo film disposed approximately in parallel with an optical axis of said taking lens, said photo film having a base surface and an emulsion surface, said subject light forming an image on said emulsion surface, a side print being recorded as a latent image on the edge of said photo film in such a manner as to flip vertically or horizontally in view of the side of said base surface; and
   a viewfinder comprising an objective lens element with negative refractive power, a first eyepiece lens element, and a second eyepiece lens element;
wherein said viewfinder satisfies the following formula:

$W > 26$ wherein W is the width of said viewfinder in mm.

8. A lens-fitted photo film unit comprising:
   a taking lens;
   a plane mirror for perpendicularly bending a photographic optical path of subject light passing through said taking lens;
   a photo film disposed approximately in parallel with an optical axis of said taking lens, said photo film having a base surface and an emulsion surface, said subject light forming an image on said emulsion surface, a side print being recorded as a latent image on the edge of said photo film in such a manner as to flip vertically or horizontally in view of the side of said base surface;
   a viewfinder comprising an objective lens element with negative refractive power, a first eyepiece lens element, and a second eyepiece lens element; and
   a flash projector for emitting a flashlight, wherein said viewfinder is movable between an unused position and a used position,
   and when said viewfinder is in said unused position, said viewfinder is disposed at the rear of said flash projector so that the field of view of said viewfinder is obstructed by said flash projector,
   and when said viewfinder is in said used position, said viewfinder pops up from the rear of said flash projector so that said flash projector retracts from the field of view of said viewfinder.

* * * * *